United States Patent
Seibt

(10) Patent No.: US 8,528,124 B2
(45) Date of Patent: Sep. 10, 2013

(54) FLUSHING APPARATUS FOR A VACUUM TOILET HAVING A NOZZLE ARRANGEMENT

(75) Inventor: Christian Seibt, Buchholz (DE)

(73) Assignee: Airbus Operations GmbH (DE)

( * ) Notice: Subject to any disclaimer, the term of this patent is extended or adjusted under 35 U.S.C. 154(b) by 846 days.

(21) Appl. No.: 12/668,087

(22) PCT Filed: Jul. 4, 2008

(86) PCT No.: PCT/EP2008/058676
§ 371 (c)(1),
(2), (4) Date: Feb. 4, 2010

(87) PCT Pub. No.: WO2009/007319
PCT Pub. Date: Jan. 15, 2009

(65) Prior Publication Data
US 2010/0180369 A1     Jul. 22, 2010

Related U.S. Application Data

(60) Provisional application No. 60/958,953, filed on Jul. 9, 2007.

(30) Foreign Application Priority Data

Jul. 9, 2007  (DE) .......................... 10 2007 031 903

(51) Int. Cl.
*E03D 11/00*     (2006.01)

(52) U.S. Cl.
USPC ............................................................. 4/431

(58) Field of Classification Search
USPC ...................................................... 4/420–442
See application file for complete search history.

(56) References Cited

U.S. PATENT DOCUMENTS

| 5,873,135 A | 2/1999 | Tornqvist |
| 6,115,853 A | 9/2000 | Shibata et al. |
| 2003/0088910 A1 | 5/2003 | Hidetaka et al. |

FOREIGN PATENT DOCUMENTS

| DE | 4134386 A1 | 4/1992 |
| GB | 2248858 A | 4/1992 |
| WO | 2007057190 A2 | 5/2007 |

*Primary Examiner* — Lori Baker
(74) *Attorney, Agent, or Firm* — Lerner, David, Littenberg, Krumholz & Mentlik, LLP

(57) ABSTRACT

A vacuum-operated sanitary device, in particular a vacuum toilet, comprising a bowl and a flushing device, with the flushing device comprising a nozzle arrangement with a nozzle inlet of a first cross section, a nozzle outlet of a second cross section, which nozzle outlet is directed onto an interior wall of the bowl, and a nozzle duct of a third cross section, which nozzle duct connects the nozzle inlet with the nozzle outlet, wherein the third cross section is smaller than both the first cross section and the second cross section; a first delivery device connected to the nozzle inlet, wherein the first delivery device is designed to deliver a first flushing medium; and a second delivery device that opens into the nozzle duct, wherein the second delivery device is designed to deliver a second flushing medium.

13 Claims, 8 Drawing Sheets

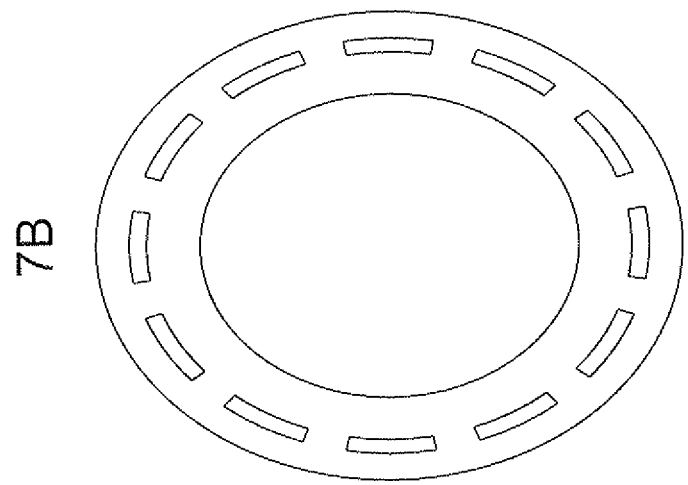
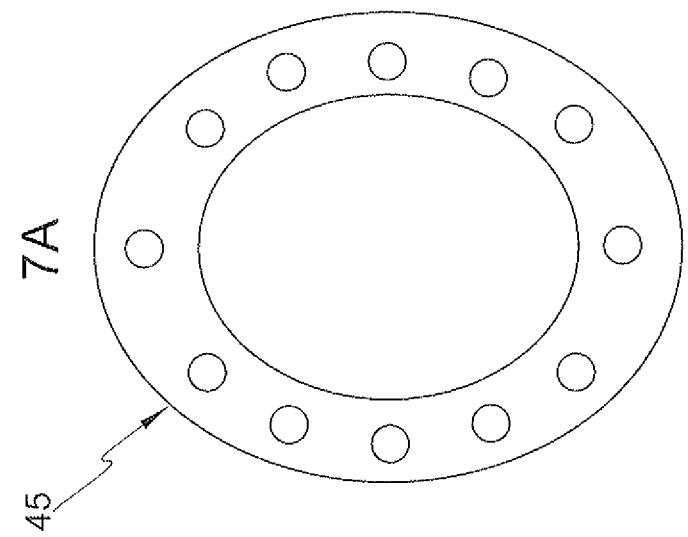
Fig. 7

FLUSHING APPARATUS FOR A VACUUM TOILET HAVING A NOZZLE ARRANGEMENT

CROSS-REFERENCE TO RELATED APPLICATIONS

This application is a national phase entry under 35 U.S.C. §371 of International Application No. PCT/EP2008/058676, filed Jul. 4, 2008, published in German, which claims the benefit of the filing date of U.S. Provisional Patent Application No. 60/958,953, filed on Jul. 9, 2007, and German Patent Application No. 10 2007 031 903.9, filed on Jul. 9, 2007, the disclosures of which applications are hereby incorporated herein by reference.

FIELD OF THE INVENTION

The invention relates to a vacuum-operated sanitary device with a flushing device that comprises a nozzle arrangement and that supports a highly-efficient flushing process. In particular, the invention relates to a vacuum toilet with a flushing device that comprises a nozzle arrangement and makes possible a highly-efficient flushing process, wherein the vacuum toilet can be used in an aircraft. Furthermore, the invention relates to an aircraft comprising such a vacuum toilet.

BACKGROUND TO THE INVENTION

In known vacuum-operated sanitary devices, in particular in vacuum toilets, for example flushing devices are provided in which a flushing action is triggered by activating a triggering device. In this arrangement flushing water is first delivered, wherein the flushing water as a rule is sprayed into the toilet pan at overpressure by way of a spray ring. This is followed by a suction removal process that is triggered in that a suction removal valve is opened. In the suction removal process the liquids and solids contained in the bowl are fed to a waste water tank. The known flushing devices are associated with a disadvantage in that spraying flushing water into the toilet only partially wets the surface of the toilet pan. Accordingly, a large amount of flushing water needs to be supplied in order to obtain an adequate cleaning effect. The known flushing devices are associated with a further disadvantage in that stubborn soiling is not completely removed during a flushing process. The fact that the pressure gradient during the suction removal process is predominantly used for conveying the medium from the toilet to the tank, rather than for surface cleaning the toilet, can also be regarded as a disadvantage of the known flushing devices. However, this requires a comparatively large quantity of water. The heavy water consumption associated with known flushing devices means that when they are used in an aircraft the latter has to carry along a heavy ballast load.

SUMMARY OF THE INVENTION

The present invention provides for a vacuum-operated sanitary device with a flushing device, which considerably improves the efficiency of the flushing process.

It should be mentioned that the embodiments of the invention that are described below equally relate to the vacuum-operated sanitary device, the vacuum toilet and the aircraft.

According to an exemplary embodiment, a vacuum-operated sanitary device for an aircraft is provided, wherein the vacuum-operated sanitary device comprises a bowl and a flushing device, with the flushing device comprising a nozzle arrangement with a nozzle inlet of a first cross section, a nozzle outlet of a second cross section, which nozzle outlet is directed to an interior wall of the bowl, and a nozzle duct of a third cross section, which nozzle duct connects the nozzle inlet with the nozzle outlet, wherein the third cross section is smaller than both the first cross section and the second cross section; a first delivery device connected to the nozzle inlet, wherein the first delivery device is designed to deliver a first flushing medium; and a second delivery device that opens into the nozzle duct, wherein the second delivery device is designed to deliver a second flushing medium.

By such a vacuum-operated sanitary device the bowl surface can be wetted completely in that a mixture of the first and the second flushing mediums is sprayed in. In this way all the media to be removed can be partly dissolved and weighted down. Furthermore, the characteristics of the mixture of the first and second flushing medium (flushing flow), for example the density, can be optimally selected by selecting, for example, a suitable flow speed of the first flushing medium in the nozzle duct. Increased density can, for example, increase the cleaning effect and can improve the removal of the matter to be conveyed from the bowl. Furthermore, such a vacuum-operated sanitary device makes possible a cleaning procedure in which the suction removal process can at the same time also be used for cleaning the bowl, in particular when the suction removal process is used to generate a defined flow in the bowl. In this process the first flushing medium can, for example, be air, while the second flushing medium can be water or a cleaning liquid.

According to an exemplary embodiment, the flushing device further comprises a third delivery device that opens into the nozzle duct, wherein the third delivery device is designed to deliver a third flushing medium.

In this way it is possible, for example, to deliver a further liquid, e.g. a cleaning liquid and/or fragrance liquid from a reservoir. Such delivery can, for example, take place in a second suction removal process of a cleaning procedure. In this arrangement the cleaning liquid can be drawn off without a pumping device only by increased negative pressure in the nozzle arrangement. Furthermore, in this way a controlled addition of cleaning agents can take place.

According to an exemplary embodiment, at least one of the delivery devices is connected to a reservoir in such a way that a flushing medium that is present in the reservoir can be delivered to the nozzle duct.

In this way it is possible, for example, for the second and/or third delivery device to be designed as an acceptance tube that can be used to accept the flushing medium from a reservoir.

According to an exemplary embodiment, at least one of the second and third delivery devices is led through the nozzle inlet.

Leading one of the second and/or third delivery devices through the nozzle inlet can, for example, facilitate necessary repairs. A delivery device led in this way can thus more easily be exchanged because intervention in the entire nozzle arrangement may not be necessary.

According to an exemplary embodiment, at least one of the second and third delivery devices is led through a sidewall of the nozzle duct.

Such a lateral delivery arrangement can be used for improved attachment of one of the second and/or third delivery devices because the delivery device can be attached to the sidewall of the nozzle duct.

According to an exemplary embodiment, an outlet opening of at least one of the second and third delivery devices is directed in the direction of a flow direction in the nozzle duct.

In this way a jet cleaning effect can be used for cleaning the bowl, wherein the jet of one of the second and/or third flushing media can be used directly on the bowl surface for cleaning, without there being any need to carry out a suction removal process.

According to an exemplary embodiment, the outlet opening comprises a spray nozzle.

By a spray nozzle a stronger jet cleaning effect and/or improved mixing of the flushing media can be achieved, as can a directional output of the flushing medium.

According to an exemplary embodiment, the first delivery device is designed to deliver air, and at least one of the second and third delivery devices is designed to deliver a liquid.

In this way a liquid can be optimally mixed with a flushing-air stream. Depending on the design of the nozzle arrangement, optimal atomising of the flushing liquid is possible. With this arrangement the flushing process can be designed to be very efficient, wherein the flushing process can comprise significantly reduced consumption of flushing liquid when compared to a conventional flushing process. In this way it is possible, for example, to save flushing water.

According to an exemplary embodiment, the vacuum-operated sanitary device further comprises an air nozzle that is directed onto the interior wall of the bowl, wherein the air nozzle comprises a nozzle inlet that is connected to the first delivery device.

By the air nozzle that is directed onto the interior wall of the bowl, a first partial quantity of the airstream can be mixed with a flushing liquid, wherein a second partial quantity of the airstream is directly led onto the interior wall of the bowl without previously having been led by way of the nozzle arrangement. In other words the flushing air is divided. A first partial quantity is delivered to the nozzle arrangement, while the second partial quantity is delivered to the air nozzle. The first partial quantity of the flushing air can then be mixed with the second flushing medium, while the second partial quantity does not have a liquid flushing medium admixed to it. The second partial quantity can then be used for blowing-in the first partial quantity, because the second partial quantity is led through the bypass of the air nozzle. The air nozzle can be aligned in such a manner that the flushing flow leaves the nozzle arrangement in closer proximity to the interior wall of the bowl than does the second partial quantity of the airstream. Thus, by blowing at a defined angle, by the second partial quantity the flushing flow can be prevented from detaching from the wall, wherein the flushing flow can be kept stable in a laminar manner.

According to an exemplary embodiment, the vacuum-operated sanitary device comprises a multitude of nozzle arrangements, wherein the nozzle arrangements are at least in part aligned along the rim of the bowl in relation to the interior wall.

By a multitude of nozzle arrangements and suitable alignment of the nozzle arrangements it is possible to achieve better wetting of the surface of the pan with the flushing flow. Furthermore, in this way it is also possible to achieve better wetting of the interior wall of the bowl with the flushing liquid during jet cleaning.

According to an exemplary embodiment, at least one of the first, second and third cross sections of a nozzle arrangement is oval.

An oval cross section can, for example, be used for improved flexibility and efficiency in the installation of the nozzle arrangement in the vacuum-operated sanitary device, and/or it can be used for improving the airstream or the flushing stream. The term "oval" can refer to a circular, elliptic or some other shape that does not greatly differ from a circular or elliptic shape. In this arrangement the further cross sections can, for example, comprise a rectangular shape or a shape of a curved rectangle or of a curved ellipse.

According to an exemplary embodiment, the vacuum-operated sanitary device is a vacuum toilet.

According to an exemplary embodiment, an aircraft with a vacuum-operated sanitary device according to the invention is provided.

As a result of the above measures the efficiency of toilet pan cleaning is improved. In this way with the cleaning effect remaining the same it is possible to save weight, or, with the quantity of a flushing liquid remaining the same the cleaning effect can be improved.

It should be noted that the term "vacuum-operated sanitary device" refers to both a vacuum toilet and a vacuum urinal or vacuum bidet. Of course, an arrangement according to the invention can also be used as a lavabo or generally as a disposal device, for example a device for disposing of general waste, for example waste from the galley in aircraft.

It should be noted that the embodiments of the invention described below equally relate to the device and to the aircraft.

The individual characteristics can of course also be mutually combined, which can in part also result in advantageous effects that go beyond the sum of the individual effects, even if these effects are not expressly described.

These and other aspects of the present invention are explained and illustrated with reference to the exemplary embodiments described below.

BRIEF DESCRIPTION OF THE DRAWINGS

Below, exemplary embodiments are described with reference to the following drawings:

FIG. 7 shows section views of exemplary embodiments with several nozzle arrangements on a vacuum-operated sanitary device.

DETAILED DESCRIPTION OF EXEMPLARY EMBODIMENTS

Below, exemplary embodiments of the invention are described with reference to the enclosed drawing.

Figure 1:
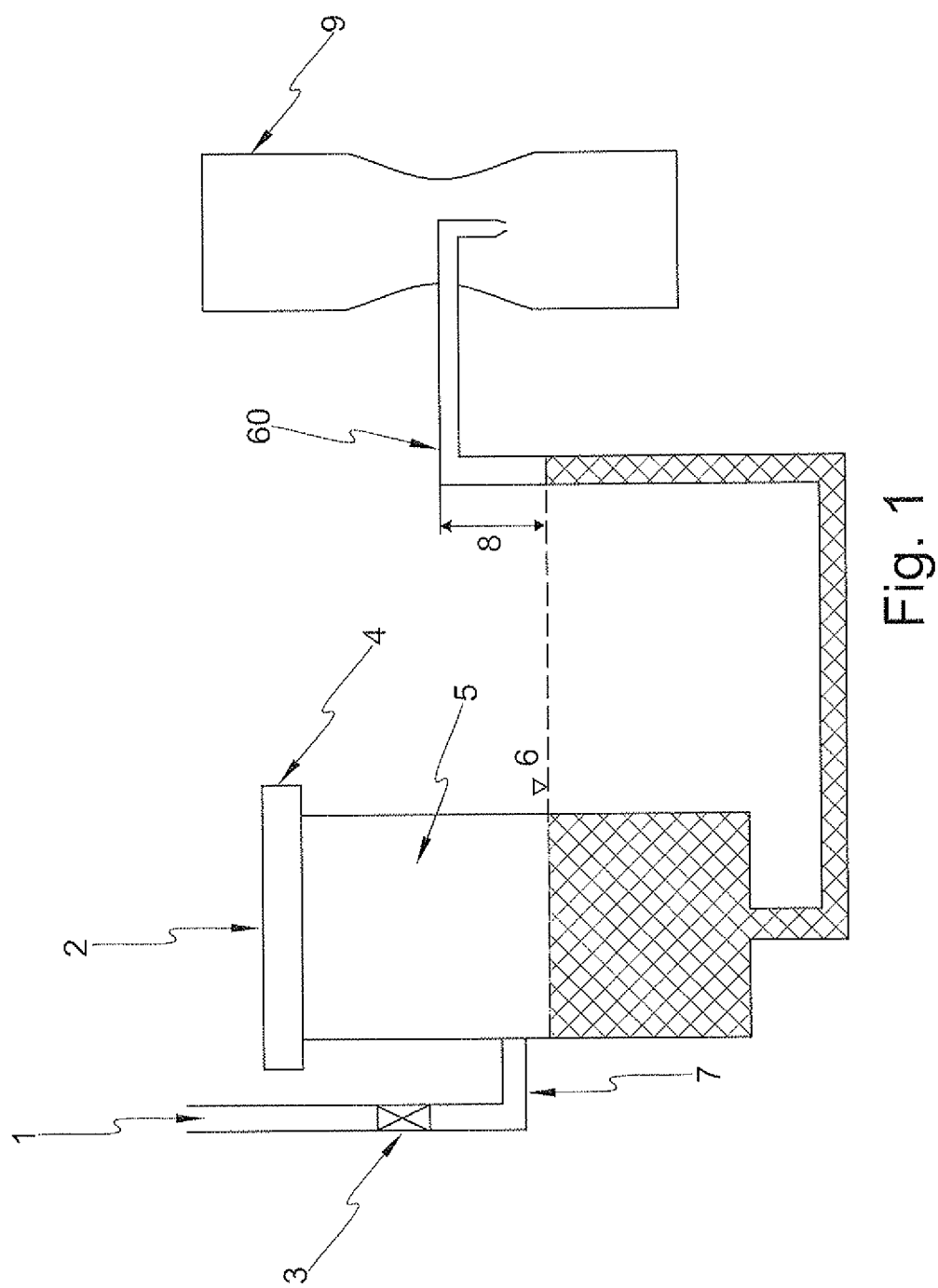
FIG. 1 shows a diagrammatic view of a nozzle arrangement with a reservoir for delivering, for example, cleaning liquids.

FIG. 1 shows a diagrammatic representation of a nozzle arrangement 9 with a reservoir 5 for the delivery of, for example, cleaning liquids for a vacuum-operated sanitary device 100 which can, for example, be a vacuum toilet. The nozzle arrangement 9 is connected to a reservoir 5 by a delivery device 60. The maximum liquid fill level 6 is determined by the height 8 of the arrangement of a maximum liquid level in the reservoir 5 in relation to the nozzle arrangement. The height 8 is selected so as to be adequate to prevent liquid from flowing into the vacuum-operated sanitary device or into the vacuum toilet unless there is a flushing process. The design of a pipe diameter and of a diameter of corresponding nozzle sections together with the negative pressure that is present during a flush-suction process determines the quantity of the cleaning liquid to be delivered over a flush-suction period. The reservoir 5 comprises a cover 4 so that the reservoir 5 provides a refill option 2. A vent pipe 7 in which the air pressure essentially corresponds to the cabin pressure 1 in a toilet monument (not shown), which vent pipe 7 comprises a nonreturn valve 3, is connected above the maximum liquid fill level 6 to the reservoir 5. The vent pipe 7 serves the purpose of providing pressure equalisation in the reservoir 5. If the reservoir 5 contains a fragrant liquid, the vent pipe 7 can also be designed without a nonreturn valve 3. In this way a pleasant fragrance can be provided in the toilet space even if no flushing process takes place.

Figure 2:
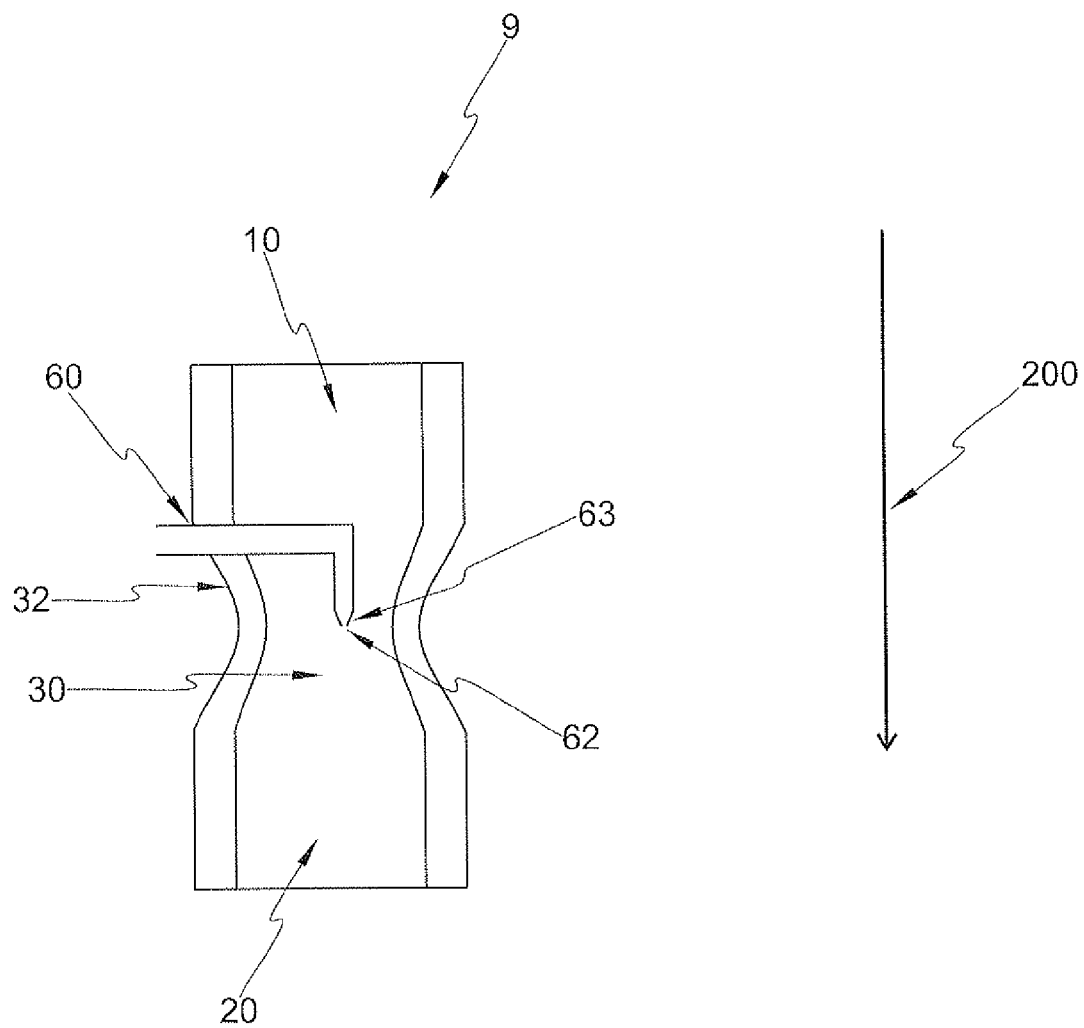
FIG. 2 shows a section view of an exemplary embodiment of a nozzle arrangement for a vacuum-operated sanitary device.

FIG. 2 shows a section view of an exemplary embodiment of a nozzle arrangement 9 for a vacuum-operated sanitary device 100. The nozzle arrangement 9 comprises a pipe section that comprises, for example, smooth walls, with a nozzle inlet 10, a nozzle outlet 20 and a nozzle duct 30. In this arrangement the cross section of the nozzle duct 30 is smaller than both the cross section of the nozzle inlet 10 and the cross section of the nozzle outlet 20. The nozzle arrangement 9 in the form of a venturi nozzle can, for example, be designed as an arrangement of two facing cones which are united at the position of their smallest diameter. At the position of the smallest diameter of the nozzle duct 30 a second delivery device 60, for example in the form of an acceptance tube, can be connected, wherein the second delivery device 60 opens into the nozzle duct 30 with an outlet opening 62. Both the nozzle arrangement 9 and the second delivery device 60 can comprise a material or a material mixture that includes, for example, plastic, ceramics, metal, glass or some other material that is suitable for use in sanitary devices. The second delivery device can be led into the nozzle duct 30 through a sidewall 32, wherein the second delivery device 60 can either be angled or straight (not shown). Such a delivery arrangement can provide better attachment of the second delivery device 60 because the second delivery device 60 can be attached to the sidewall 32 of the nozzle duct 30. Furthermore, such a delivery arrangement can serve the purpose of providing a better arrangement of the maximum liquid level 6 in the reservoir 5 in relation to the nozzle arrangement 9.

However, it is also possible to lead the second delivery device 60, for example, through the nozzle inlet 10 into the nozzle duct 30. A delivery device designed in this manner can thus more easily be exchanged if repairs become necessary, because there may not be any need to intervene in the entire nozzle arrangement. The outlet opening 62 of the second delivery device 60 can, for example, comprise a spray nozzle 63.

The nozzle arrangement acts in a manner that is similar to that of a venturi tube. As a result of the negative pressure generated in the nozzle duct, it is then possible from the second and third delivery devices, for example, to draw off by suction a rinsing liquid, cleaning liquid or fragrant liquid. The behaviour of a gas/liquid flow in the nozzle arrangement 9 is determined by Bernoulli's law. If a gaseous or liquid medium flows through the venturi nozzle 9 in the flow direction 200, which medium is introduced through the nozzle inlet 10 into the nozzle arrangement 9, then at the narrowest position of the pipe (nozzle duct 30) the dynamic pressure (banking-up pressure) is at its maximum and the static pressure (at-rest pressure) is at its minimum. According to the law of continuity, the speed of the flowing gas or of the liquid increases proportionally to the cross sections when flowing through the restricted part in the nozzle duct 30. This results in an increased flow speed in the nozzle duct 30. At the same time the pressure in the second delivery device 60 drops, in particular in its outlet opening which is precisely arranged in the nozzle duct 30, for example at the narrowest position in the nozzle duct 30. In this way in a very effective manner and without any further energy impact a vacuum is generated which can then be used in various measuring devices or for the purpose of drawing off gases and/or liquids from an acceptance tube. In this way, by the venturi nozzle, gases can be mixed with gases, gases with liquids, and/or liquids with liquids. The respective corresponding mixtures are then drawn off from the nozzle arrangement 9 through the nozzle outlet 20.

Figure 3:
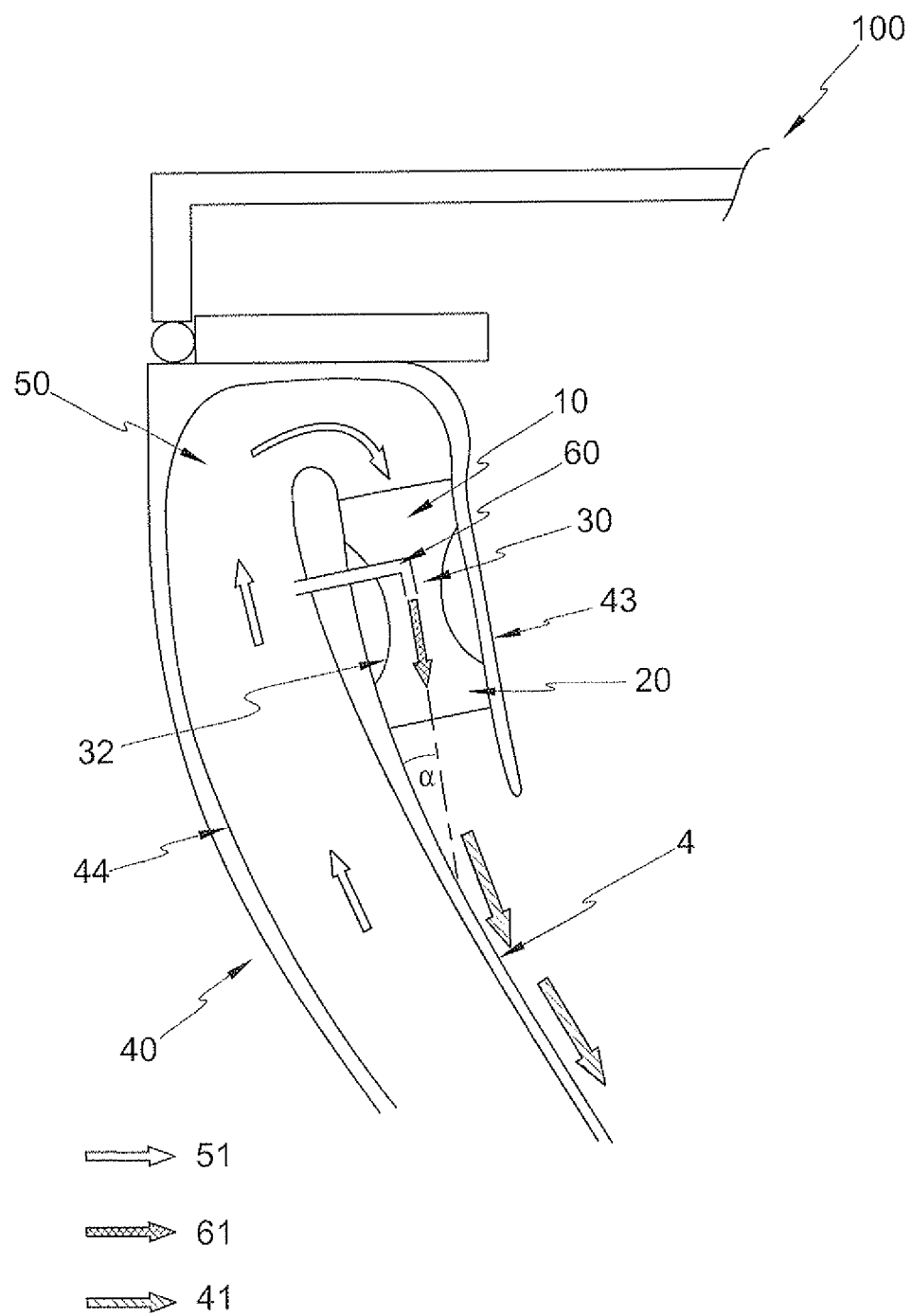
FIG. 3 shows a section view of an integrated nozzle arrangement in the flushing-air stream according to an exemplary embodiment of the vacuum-operated sanitary device according to the invention.

FIG. 3 shows a section view of a nozzle arrangement that is integrated in the flushing-air stream, according to an exemplary embodiment of the vacuum-operated sanitary device 100 according to the invention. The vacuum-operated sanitary device shown in FIG. 3 is a vacuum toilet that comprises a bowl or a pan 40 with a nozzle arrangement 9 or a multitude of nozzle arrangements 9. In this arrangement the venturi nozzles 9 can be arranged in a conically tapering gap between an interior wall 42 of the bowl 40 or a surface 42 of the pan and a jacket 43 in the upper region of the bowl 40. Furthermore, a multitude of the nozzle arrangements 9 that are designed as venturi nozzles can be arranged as a ring nozzle (spray ring). In the embodiment shown the nozzle inlet 10 is connected to a first delivery device 50, wherein the nozzle outlet 20 is aligned at a specific angle α (alpha) in relation to the interior wall 42 of the bowl 40 or the surface 42 of the pan. In this arrangement the first delivery device 50 can be affixed in a hollow space between the interior wall 42 and an outer jacket 44 of the bowl 40. The bowl 40 can be made from a material that is commonly used in sanitary devices, for example ceramics, porcelain and/or metal. The surface 42 of the pan can partly or entirely comprise an ideally anti-adhesive material and can be curved in a concave manner.

A flushing process or a cleaning procedure can, for example, comprise two steps.

In a first step the cleaning procedure can start with jet cleaning. In this first step, a small quantity of a second flushing medium 61, which can for example be water or water enriched with a cleaning agent, is briefly sprayed at overpressure by way of the second delivery device 60 at a particular angle onto the surface 42 of the pan. When the alignment of the outlet opening of the second delivery device 60 agrees with the alignment of the nozzle arrangement 9 or of the nozzle exit 20, the angle corresponds to the angle α (alpha) shown in FIG. 3. However, other angles are also possible. In this way stubborn soiling is partly dissolved and/or detached, and the media to be removed are weighted down. The jet cleaning effect can be increased by an outlet opening 62 of the second delivery device 60, which outlet opening 62 comprises a spray nozzle 63.

In a second step a suction removal process takes place. In this way, by negative pressure that arises in the toilet pan 40 during the suction removal process, a flow of the first flushing medium 51 in the first delivery device 50 is triggered, wherein the first flushing medium can, for example, be air. The airflow 51 enters the nozzle device 9, designed as a venturi nozzle, through the nozzle inlet 10 and in the region of the nozzle duct 30 creates negative pressure. In this way water 61 is removed by suction, by way of the second delivery device 60, into the nozzle duct, and said water 61 is atomised in the flowing air 51 in the nozzle duct 30. A flushing stream 41 of humidified air that arises during air-water mixing is directed by way of the nozzle outlet 20 at a particular angle α (alpha) onto the interior wall 42 of the bowl 40 and is then led away through the toilet outlet (not shown) into a waste water tank or a waste water container (not shown). In this way matter that is to be conveyed, which matter in the first step arises as a result of the soiling that has been partly dissolved and/or detached, and weighted-down media to be removed are conveyed to the waste water tank. In this arrangement a pressure valve (not shown) on the second delivery device 60 and/or a short flushing water delivery can be provided so that at the beginning of the suction removal process the second flushing medium 61 can flow into the second delivery device 60.

It can be considered to be advantageous that an efficient water-saving cleaning procedure can take place in which by an enforced flow as a result of suction removal only the suction removal process needs to be carried out.

Such a cleaning procedure can, for example, be used with light soiling and/or smaller quantities of media to be led away. A flushing process can continue to be combined in any desired sequence with the above-mentioned two-step flushing process in order to achieve a greater cleaning effect.

In the case of a straight, i.e. non-angled, design of the second delivery device 60 that is led in through the sidewall 32 of the nozzle duct 30, the second flushing medium 61 is horizontally (perpendicularly) led into the nozzle duct 30 in relation to the flow direction 200. By an angled design of the second delivery device 60, which is led in through the sidewall 32 of the nozzle duct 30, the second flushing medium 61 can be led into the nozzle duct 30 vertically (parallel) in relation to the flow direction 200.

Figure 4:
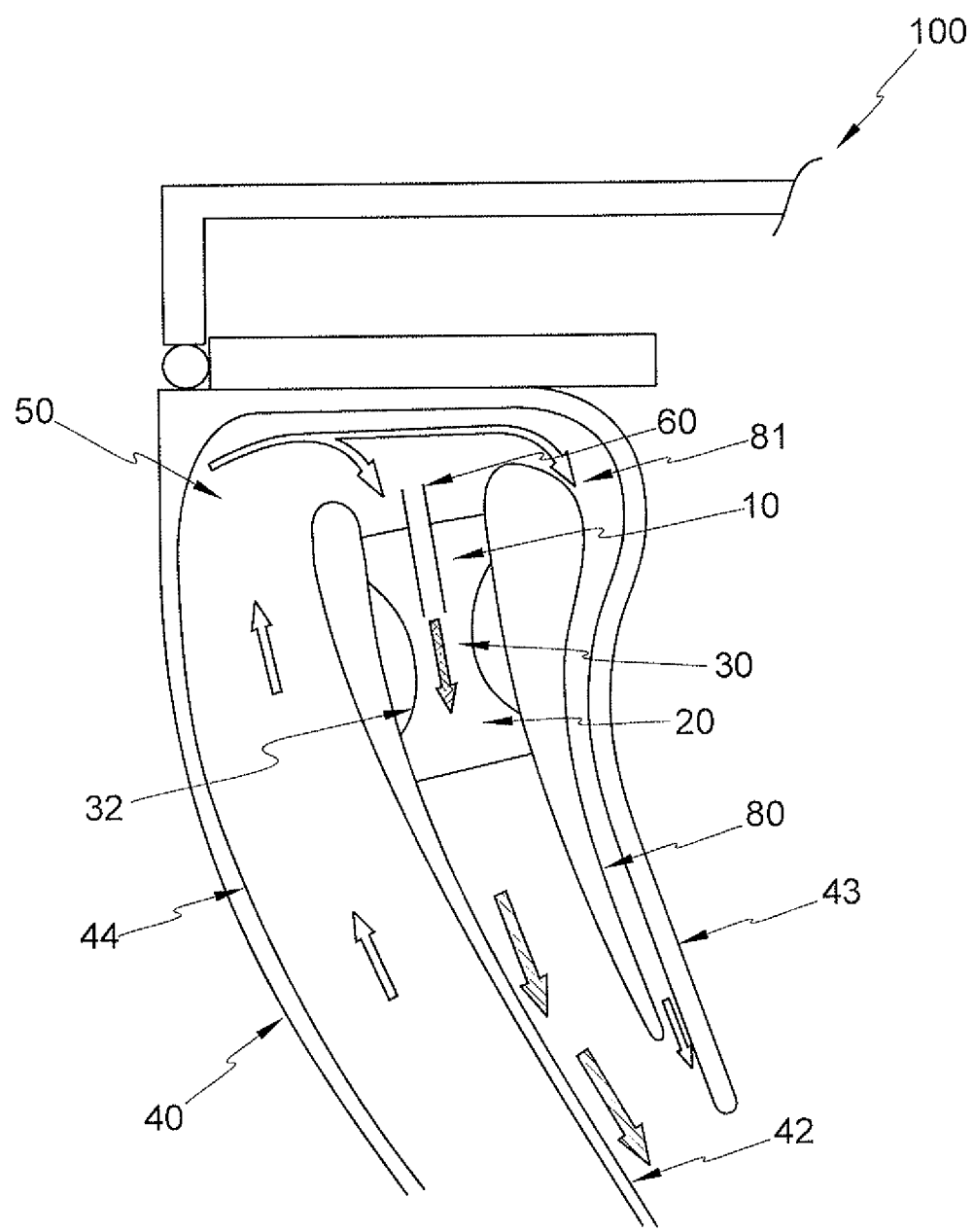
FIG. 4 shows a section view of an integrated nozzle arrangement with a second flushing-air duct or air nozzle with air guidance function according to a further exemplary embodiment of the vacuum-operated sanitary device according to the invention.

FIG. 4 shows a section view of an integrated nozzle arrangement with an air nozzle with air guidance function according to a further exemplary embodiment of the vacuum-operated sanitary device according to the invention. The vacuum-operated sanitary device shown in FIG. 4 is a vacuum toilet which when compared to that of FIG. 2 comprises an air nozzle 80 that is directed onto the interior wall 42 of the bowl. A nozzle inlet 81 is connected to the first delivery device 50. The air nozzle 80 can be designed as a split-off of the first delivery device 50 in the upper region of the bowl 40. With such a design of the air nozzle 80 a section of the jacket 43 in the upper region of the bowl 40 is doubled. In this arrangement the air nozzle 80 can be affixed in a further conically tapering gap between two parts of the doubled section of the jacket 43.

Such a vacuum toilet makes it possible to have the same cleaning procedures as those of the embodiment shown in FIG. 1. In a suction process, by the air nozzle directed onto the interior wall 42 of the bowl 40, a second partial quantity of the airstream 51 is directly led onto the interior wall 42 of the bowl 40 without first being led by way of the nozzle arrangement. A first partial quantity of the airstream 51 is led away into the nozzle arrangement 30 and is mixed with the flushing liquid 61. The air nozzle 80 can be aligned in such a way that the flushing flow 41 leaves the nozzle arrangement in closer proximity to the interior wall of the bowl 40 than does the second partial quantity of the airstream 51. Thus, by blowing at a defined angle, by the second partial quantity the flushing flow can be prevented from detaching from the wall 42, wherein the flushing flow 41 can be kept stable in a laminar manner.

Figure 5:
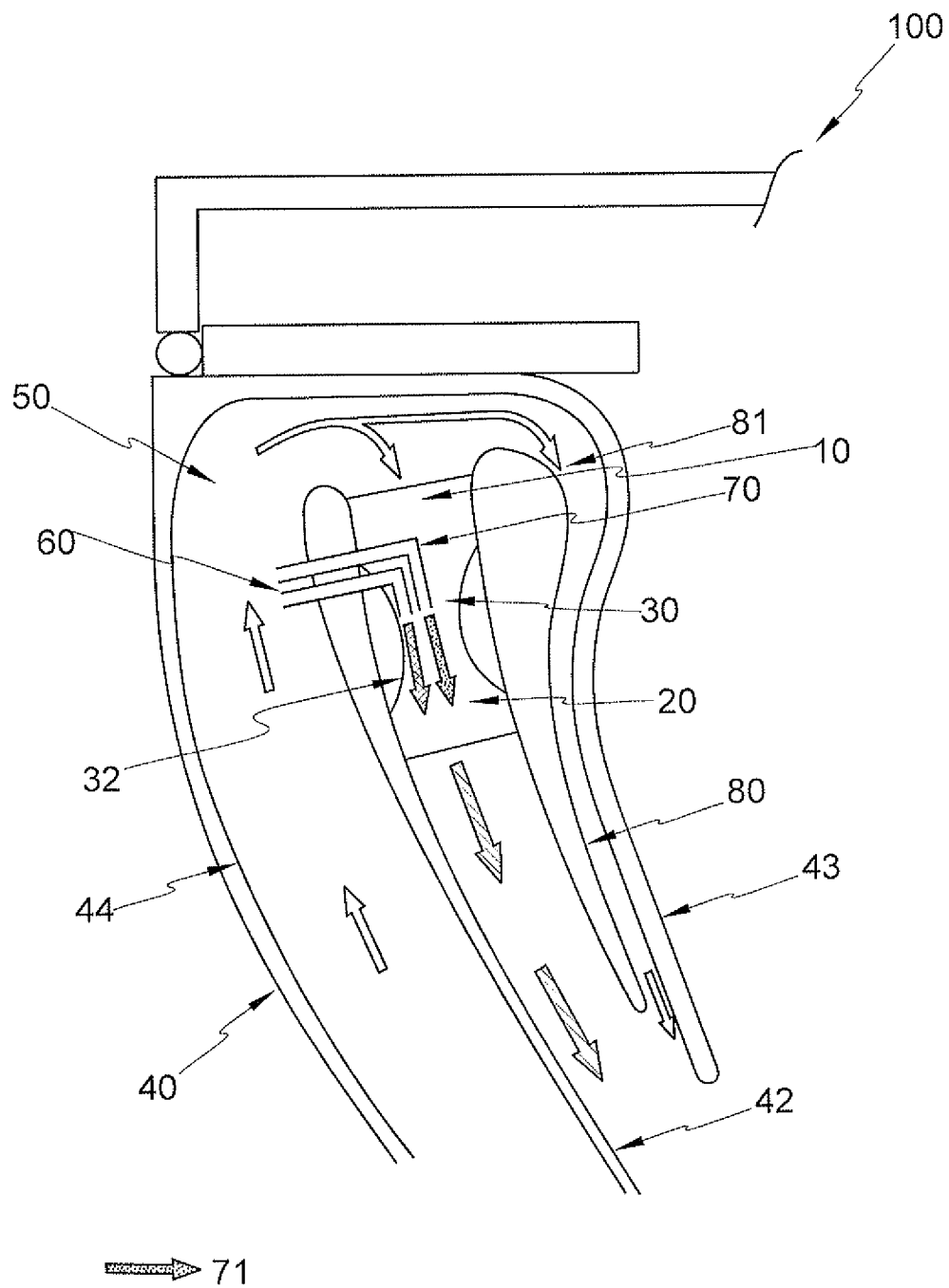
FIG. 5 shows a section view of an integrated nozzle arrangement with a second flushing-air duct or air nozzle with air guidance function and a third delivery device, for example for cleaning liquids, according to a further exemplary embodiment of the vacuum-operated sanitary device according to the invention.

FIG. 5 shows a section view of an integrated nozzle arrangement with an air nozzle with air guidance function and a third delivery device, for example for cleaning liquids, according to a further exemplary embodiment of the vacuum-operated sanitary device 100 according to the invention. The vacuum-operated sanitary device shown in FIG. 5 is a vacuum toilet which when compared to that of FIG. 4 in addition comprises a third delivery device, which opens into the nozzle duct 30, or a further acceptance tube 70. This third delivery device 70 is designed for the delivery of a third flushing medium 71, wherein the third flushing medium 71 can, for example, be a cleaning agent (a detergent) that can be delivered in the form of a cleaning liquid. However, it is also possible to deliver solid media in powder form etc. The third delivery device 70 can be connected to the position of the smallest diameter (nozzle duct 30), wherein the third delivery device 70 leads into the nozzle duct 30. The third delivery device 70 can comprise a material or a material mixture that includes, for example, plastic, ceramics, metal, glass or some other material that is suitable for use in sanitary devices. The third delivery device 70 can be led into the nozzle duct 30 through a sidewall 32, wherein the third delivery device 70 can either be angled or straight (not shown). The third delivery device 70 can, however, for example also be led into the nozzle duct 30 through the nozzle inlet 10. The outlet opening of the third delivery device 70 can, for example, comprise a spray nozzle (not shown).

In a straight design of the third delivery device 70 that is led in through the sidewall 32 of the nozzle duct 30, the third flushing medium 71 is led into the nozzle duct 30 horizontally (vertically) in relation to the flow direction 200. By a straight design of the third delivery device 70 that is led in through the sidewall 32 of the nozzle duct 30, the third flushing medium 71 can be led into the nozzle duct 30 vertically (parallel) in relation to the flow direction 200.

This embodiment makes possible, for example, a flushing process that includes three steps.

In a first step the cleaning procedure can commence with a first suction removal process. In this process, as a result of negative pressure arising in the toilet pan 40 during the suction removal process, a flow 51 of the first flushing medium in the first delivery device 50 is caused, wherein the first flushing medium can, for example, be air. Part of the airstream 51 enters through the nozzle inlet 10 into the nozzle arrangement 9, which is designed as a venturi nozzle, and generates negative pressure in the region of the nozzle duct 30. In this way the cleaning liquid 71 is removed by suction into the nozzle duct by way of the third delivery device 70 and is atomised in the flowing air 51. A flushing stream 41 of the atomised cleaning liquid is led to the interior wall 42 of the bowl 40 by way of the nozzle outlet 20 at a specific angle α (alpha), wherein the flushing stream 41 is kept stable in a laminar manner along the interior wall 42 by the airflow 51 guided through the air nozzle 80. The surface 42 of the pan can thus be completely wetted with cleaning liquid 71. In this way the media to be led away are weighted down and removed by suction, and stubborn soiling is partly dissolved.

In a second step, which can take place after the suction removal process and after a short period of reaction, jet cleaning is carried out. In this process by overpressure a small quantity of the second flushing medium 61, which can, for example, be water or water enriched with a cleaning agent, is sprayed-in for a short period of time at a defined angle onto the surface 42 of the pan by way of the second delivery device.

When the alignment of the outlet opening of the second delivery device 60 corresponds to the alignment of the nozzle arrangement 9 or of the nozzle outlet 20, the angle corresponds to the angle α (alpha) shown in FIG. 3. However, angles that differ from this are also possible. In this way stubborn and partly dissolved soiling is further detached by the jet cleaning effect.

In the third step a second suction removal process is carried out. In this process, as a result of negative pressure that arises in the toilet pan 40 during the suction removal process a flow 51 of the first flushing medium in the first delivery device 50 is caused, wherein the first flushing medium can, for example, be air. Part of the airflow 51 enters the nozzle device 9, which is designed as a venturi nozzle, through the nozzle inlet 10, where in the region of the nozzle duct 30 it generates negative pressure. In this way the second flushing medium 61, which can, for example, be water or water enriched with a cleaning agent, is removed by suction into the nozzle duct by way of the second delivery device 60 and is atomised in the flowing air 51. A flushing stream 41 of the atomised water is led to the interior wall 42 of the bowl 40 by way of the nozzle duct at a defined angle α (alpha), wherein by the airflow 51 that is led through the air nozzle 80 the flushing stream 41 is kept stable in a laminar manner along the interior wall 42. In this way the particles detached in the previous steps are completely removed by way of the toilet outlet (not shown) and are conveyed to the waste water container (not shown). For this suction removal process a pressure valve (not shown) on the second delivery device 60 and/or a short flushing-water delivery device can be provided so that at the beginning of the suction removal process the second flushing medium 61 can flow into the second delivery device 60.

The vacuum toilet 100 can also be operated as a waterless toilet. In this arrangement, for example, the second delivery device 60, the third delivery device 70 and/or the venturi nozzle or the ring nozzle 9 are removed. A further option of operating the vacuum toilet 100 also as a waterless toilet consists of the use of a gaseous second and/or third flushing medium.

The vacuum toilet 100 can also be used as a conventional vacuum toilet. In a conventional cleaning method first the flushing water 61 is directly sprayed onto the surface 42 of the pan without a suction removal process, and subsequently a suction removal process is carried out. In this suction removal process the flushing air 51 can be humidified in the venturi nozzle.

The average person skilled in the art will provide for a corresponding time sequence of individual phases of the respective steps of all the cleaning procedures stated above. These individual phases and the periods and sequence of the individual steps within a cleaning procedure are to be determined by the average person skilled in the art so as to correspond to an "ideal" cleaning process.

Figure 6:
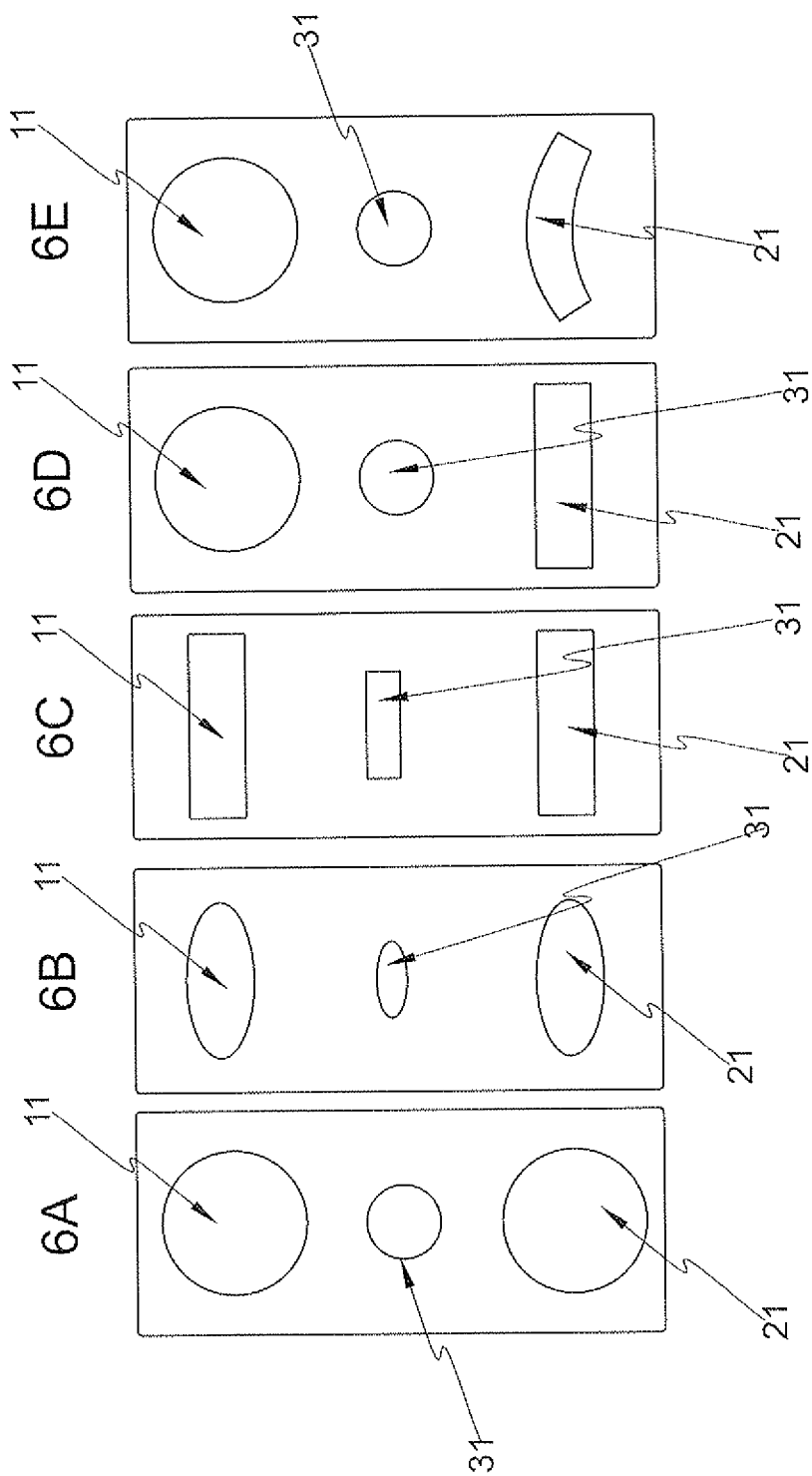
FIG. 6 shows some exemplary embodiments of various cross sections of nozzle inlets, nozzle ducts and nozzle outlets.

FIG. 6 shows some exemplary embodiments of various cross sections 11, 31, 21 of nozzle inlets 10, nozzle ducts 30 and nozzle outlets 21, wherein the first cross section 11 is a cross section of the nozzle inlet 10, the second cross section 21 is a cross section of the nozzle inlet 20, and the third cross section 31 is a cross section of the nozzle duct 30. The cross sections shown in FIG. 6A are circular. The cross sections shown in FIG. 6B are oval. The cross sections, shown in FIG. 6C, of the nozzle inlet, nozzle duct and nozzle outlet are rectangular. FIG. 6D shows a circular cross section 11 of the nozzle inlet, a circular cross section 31 of the nozzle duct, and a rectangular cross section 21 of the nozzle outlet. FIG. 6E shows a circular cross section 11 of the nozzle inlet, a circular cross section 31 of the nozzle duct, and a cross section 21 of the nozzle outlet in the shape of a curved rectangle. The cross sections shown in FIG. 6 can be combined as desired. In this context it should be ensured that the cross section 31 of the nozzle duct is smaller than both the cross section 11 of the nozzle inlet and the cross section 21 of the nozzle outlet. An oval shape can include an elliptic shape or some other shape that, for example, does not greatly differ from a circular or an elliptic shape. Furthermore, an oval shape can also comprise the shape of a rectangle with rounded corners. It is imaginable for at least one of the cross sections 11, 21, 31 to be designed in the shape of a curved oval (not shown). An oval or a curved cross section can, for example, provide increased flexibility during installation of the nozzle arrangement in the vacuum-operated sanitary device and/or improved airflow and flushing flow in the bowl.

FIG. 7 shows cross-sectional views of exemplary embodiments with several nozzle arrangements on a vacuum-operated sanitary device, wherein the nozzle arrangements 9 are at least in part, along an edge or a rim 45 of the bowl 40, directed onto the interior wall 42 of the bowl 40. The nozzle arrangements shown in FIG. 7 are arranged as a spray ring or a ring nozzle. FIG. 7A shows a top view of a spray-ring-shaped arrangement of the nozzle arrangements 9, wherein the nozzle inlets 10 that are shown are circular. FIG. 7B shows a bottom view of a spray-ring-shaped arrangement of the nozzle arrangements 9, wherein the nozzle outlets 20 are curved rectangles. The number of nozzle arrangements 9 and the distances between the individual nozzle arrangements 9 which represent the spray ring can be selected so that the surface 42 of the pan can be optimally wetted. With a multitude of nozzle arrangements 9 and suitable alignment of the nozzle arrangements it is possible to achieve improved wetting of the surface 42 of the pan by the flushing flow 41. Furthermore, in this way it is also possible to achieve improved wetting of the interior wall 42 of the bowl 40 with the flushing liquid during jet cleaning. It should be noted that the nozzle arrangement 9 can also be a ring nozzle arrangement that is essentially continuous or uninterrupted, for example in the shape of a slotted nozzle that encloses the bowl at least in part, which slotted nozzle is, for example, interrupted or supported only for stability purposes.

With a vacuum-operated sanitary device according to one of the above-described embodiments, the bowl surface can be completely wetted by spraying-in an optimal mixture of the flushing media. In this way all the media to be removed can be partly dissolved and weighted down. Furthermore, the characteristics, for example the density of the mixture of the flushing media used (flushing flow), can be optimally selected by selecting a suitable flow speed of the first flushing medium in the nozzle duct. Higher density can improve the cleaning effect and the removal of the matter to be conveyed from the bowl. Furthermore, such a vacuum-operated sanitary device makes possible a cleaning procedure in which a suction removal process can at the same time also be used for cleaning the bowl. Depending on the design of the nozzle arrangement, optimal atomising of the flushing liquid and/or cleaning fluid is possible. With such a vacuum-operated sanitary device a flushing process can be designed to be very efficient, wherein the flushing process can comprise the use of significantly less flushing liquid when compared to that of a conventional flushing process. In this way it is possible, for example, to save flushing water. With the cleaning effect remaining the same in this way weight is saved or, with the quantity of a flushing liquid remaining the same the cleaning effect is improved. Saving weight is particularly significant when the vacuum-operated sanitary device is used in an aircraft.

Figure 8:
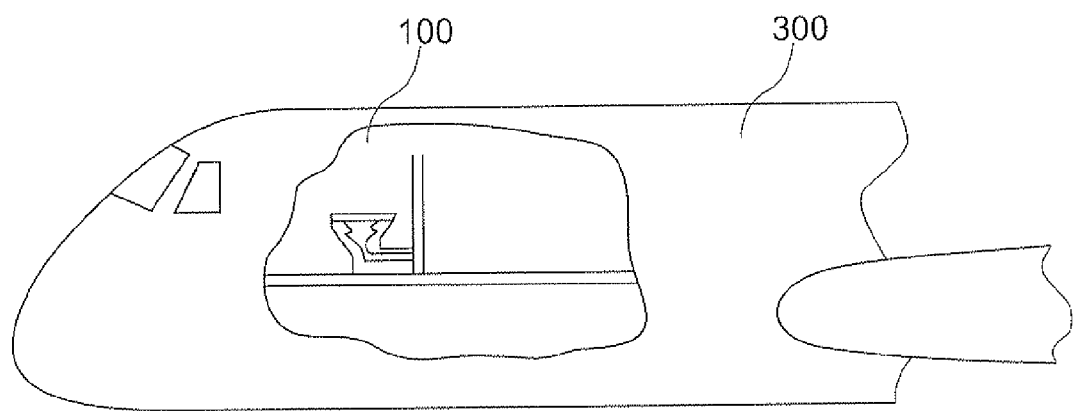
FIG. 8 shows an aircraft which comprises a vacuum-operated sanitary device according to an exemplary embodiment.

FIG. 8 shows an aircraft 300 with a vacuum-operated sanitary device 100 contained therein in the form of a vacuum toilet according to an exemplary embodiment.

Although the invention has been described with reference to exemplary embodiments, various alterations and modifications can be made without leaving the scope of protection of the invention. The invention can also be used in fields other than in aviation, for example in trains, ships or boats where there may also be a requirement for vacuum-operated sanitary devices and where an efficient and water-saving cleaning procedure is desirable.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Cabin pressure in the toilet monument
2 Refilling option
3 Nonreturn valve
4 Cover
5 Reservoir
6 Maximum liquid fill level
7 Vent pipe
8 Arrangement of the maximum liquid level in the reservoir to the nozzle arrangement
9 Nozzle arrangement
10 Nozzle inlet
11 First cross section
20 Nozzle outlet
21 Second cross section
30 Nozzle duct
31 Third cross section
32 Sidewall of the nozzle duct
40 Bowl
41 Flushing flow (flushing stream)
42 Interior wall of the bowl
43 Jacket
44 Outer jacket
45 Rim of the bowl
50 First delivery device
51 Flow of the first flushing medium
60 Second delivery device
61 Second flushing medium
62 Outlet opening of the second delivery device
63 Spray nozzle
70 Third delivery device
71 Third flushing medium
80 Air nozzle
81 Nozzle inlet of the air nozzle
100 Vacuum-operated sanitary device
200 Flow direction
300 Aircraft

The invention claimed is:

1. A vacuum-operated sanitary device for an aircraft, wherein the vacuum-operated sanitary device comprises a bowl and a flushing device, with the flushing device comprising:
   a nozzle arrangement with
      a nozzle inlet of a first cross section;
      a nozzle outlet of a second cross section; and
      a nozzle duct of a third cross section;
   a first delivery device connected to the nozzle inlet;
   a second delivery device opening into the nozzle duct; and
   an air nozzle directed onto an interior wall of the bowl;
   wherein the nozzle outlet is directed onto the interior wall of the bowl;
   wherein the nozzle duct connects the nozzle inlet to the nozzle outlet;
   wherein the third cross section is smaller than both the first cross section and the second cross section;
   wherein the first delivery device is configured to deliver a first flushing medium;
   wherein the second delivery device is configured to deliver a second flushing medium;
   wherein the air nozzle comprises a nozzle inlet connected to the first delivery device, such that a first partial quantity of the first flushing medium is delivered to the nozzle arrangement and mixed with the second flushing medium, and a second partial quantity of the first flushing medium is delivered to the air nozzle;
   wherein the air nozzle is aligned such that a mixture of the first and second flushing medium leaves the nozzle arrangement in closer proximity to the interior wall of the bowl than the second partial quantity.

2. The vacuum-operated sanitary device of claim 1, wherein the flushing device further comprises:
   a third delivery device opening into the nozzle duct, wherein the third delivery device is configured to deliver a third flushing medium.

3. The vacuum-operated sanitary device of claim 1, wherein at least one of the delivery devices is connected to a reservoir in such a way as to deliver flushing medium present in the reservoir to the nozzle duct.

4. The vacuum-operated sanitary device of claim 1, wherein at least one of the second and third delivery devices is led through the nozzle inlet.

5. The vacuum-operated sanitary device of claim 1, wherein at least one of the second and third delivery devices is led through a sidewall of the nozzle duct.

6. The vacuum-operated sanitary device of claim 1, wherein an outlet opening of at least one of the second and third delivery devices is directed in the direction of a flow direction in the nozzle duct.

7. The vacuum-operated sanitary device of claim 1, wherein an outlet opening of at least one of the second and third delivery devices comprises a spray nozzle.

8. The vacuum-operated sanitary device of claim 2, wherein
   the first delivery device is configured to deliver air, and
   at least one of the second and third delivery devices is configured to deliver a liquid.

9. The vacuum-operated sanitary device of claim 1, comprising a plurality of nozzle arrangements, wherein the nozzle arrangements are at least in part aligned along the rim of the bowl towards the interior wall.

10. The vacuum-operated sanitary device of claim 1, wherein at least one of the first, second and third cross sections of a nozzle arrangement is oval.

11. The vacuum-operated sanitary device of claim 1, wherein the nozzle outlet is aligned at a specific angle in relation to the interior wall of the bowl.

12. The vacuum-operated sanitary device of claim 1, wherein the vacuum-operated sanitary device is a vacuum toilet.

13. An aircraft comprising a vacuum-operated sanitary device, the vacuum-operated sanitary device comprising:

a bowl and a flushing device, with the flushing device comprising:

a nozzle arrangement with a nozzle inlet of a first cross section; a nozzle outlet of a second cross section; and a nozzle duct of a third cross section;

a first delivery device connected to the nozzle inlet;

a second delivery device opening into the nozzle duct; and an air nozzle directed onto an interior wall of the bowl;

wherein the nozzle outlet is directed onto the interior wall of the bowl;

wherein the nozzle duct connects the nozzle inlet to the nozzle outlet;

wherein the third cross section is smaller than both the first cross section and the second cross section;

wherein the first delivery device is configured to deliver a first flushing medium;

wherein the second delivery device is configured to deliver a second flushing medium;

wherein the air nozzle comprises a nozzle inlet connected to the first delivery device, such that a first partial quantity of the first flushing medium is delivered to the nozzle arrangement and mixed with the second flushing medium, and a second partial quantity of the first flushing medium is delivered to the air nozzle;

wherein the air nozzle is aligned such that a mixture of the first and second flushing medium leaves the nozzle arrangement in closer proximity to the interior wall of the bowl than the second partial quantity.

\* \* \* \* \*